US006801835B2

(12) United States Patent
Covington et al.

(10) Patent No.: US 6,801,835 B2
(45) Date of Patent: Oct. 5, 2004

(54) SYSTEM AND METHOD FOR CONTROLLING AN AUTOMATED FUELING STATION

(75) Inventors: Steve Covington, New Braunfels, TX (US); David Ashby, New Braunfels, TX (US)

(73) Assignee: Autogas Systems, Inc., Abilene, TX (US)

( * ) Notice: Subject to any disclaimer, the term of this patent is extended or adjusted under 35 U.S.C. 154(b) by 31 days.

(21) Appl. No.: 10/138,456

(22) Filed: May 3, 2002

(65) Prior Publication Data

US 2002/0128988 A1 Sep. 12, 2002

Related U.S. Application Data

(63) Continuation-in-part of application No. 09/796,664, filed on Feb. 28, 2001, now Pat. No. 6,725,106.
(60) Provisional application No. 60/185,327, filed on Feb. 28, 2000.

(51) Int. Cl.[7] .......................... G06F 17/60; G05D 7/06; G07G 1/14

(52) U.S. Cl. ...................... 700/283; 700/231; 700/241; 235/381

(58) Field of Search ......................... 700/90, 282, 236, 700/237, 239, 9, 19–21, 231, 238, 232, 241, 283; 235/384, 381; 141/94; 705/413

(56) References Cited

U.S. PATENT DOCUMENTS

| | | | | | |
|---|---|---|---|---|---|
| 3,536,109 | A | * | 10/1970 | Ginsburgh et al. | 141/98 |
| 3,786,421 | A | * | 1/1974 | Wostl et al. | 235/381 |
| 5,327,066 | A | * | 7/1994 | Smith | 320/109 |
| 5,694,326 | A | * | 12/1997 | Warn et al. | 700/231 |
| 5,790,410 | A | * | 8/1998 | Warn et al. | 700/232 |
| 5,889,676 | A | * | 3/1999 | Kubo et al. | 700/231 |
| 5,980,090 | A | * | 11/1999 | Royal et al. | 700/241 |
| 6,052,629 | A | * | 4/2000 | Leatherman et al. | 700/241 |
| 6,073,840 | A | * | 6/2000 | Marion | 235/381 |
| 6,098,879 | A | * | 8/2000 | Terranova | 235/384 |
| 6,264,103 | B1 | * | 7/2001 | Stanley | 235/381 |
| 6,390,151 | B1 | * | 5/2002 | Christman et al. | 141/231 |

* cited by examiner

*Primary Examiner*—Paul Rodriguez
(74) *Attorney, Agent, or Firm*—Steven W. Smith

(57) ABSTRACT

A system and method for controlling an automated fueling station having a plurality of fuel dispensers that accepting payment from a customer and dispense fuel. The system may perform consumer card authorizations utilizing a remote host server or a local database. A plurality of dispenser controllers are located at the fueling station, and each of the controllers is associated with and controls one of the dispensers. Each of the dispenser controllers includes a network connection to the server or local database for accessing consumer card authorization information. A failure of a single dispenser controller affects only the fuel dispenser associated with the failed controller. In another embodiment, the dispenser controllers are connected to the fuel dispensers through an Internet Protocol (IP)-based network that enables any controller to control any dispenser or combination of dispensers.

25 Claims, 9 Drawing Sheets

SYSTEM AND METHOD FOR CONTROLLING AN AUTOMATED FUELING STATION

RELATED APPLICATIONS

This application is a Continuation-in-Part of co-owned U.S. patent application Ser. No. 09/796,664 now U.S. Pat. No. 6,725,106 entitled, System and Method for Backing Up Distributed Controllers in a Data Network, filed Feb. 28, 2001, and which claims priority on provisional application No. 60/185,327 filed Feb. 28, 2000, in the names of Steve Covington and David Ashby.

BACKGROUND OF THE INVENTION

1. Technical Field of the Invention

This invention relates to distributed data networks. More particularly, and not by way of limitation, the present invention is directed to a system and method for controlling an automated fueling station utilizing distributed controllers.

2. Description of Related Art

Data networks today may be distributed over wide areas, with a plurality of site locations being linked together over the network. Each of the distributed sites is typically controlled by a site controller or central processing unit (CPU) such as a personal computer (PC). For various reasons (for example, power supply failure, hard disk crash, motherboard failure, etc.), a site controller may occasionally fail. Currently, whenever a site controller fails, a network operator must locate an available service technician (and parts) to travel to the site to repair or replace the failed controller. During this time, the entire site is out of business. That is, the operator of the site is unable to service his customers. Site downtime could be measured in hours or even days.

The above scenario is particularly true at gasoline stations run by major oil companies. At each station, a centralized site controller controls all of the communications with the plurality of gasoline dispensers. Today, dispensers include magnetic card readers for credit and debit cards, and may also include devices such as bar code readers, cash acceptors, and change machines. All of these devices are rendered useless if the central site controller fails.

In order to overcome the shortcomings of existing network architectures, it would be advantageous to have a system and method for controlling an automated fueling station utilizing a data network and distributed controllers at each site. The present invention provides such a system and method.

SUMMARY OF THE INVENTION

In one aspect, the present invention is directed to a system for controlling an automated fueling station having a plurality of fuel dispensers. Each of the dispensers includes means for dispensing fuel and means for accepting payment from a customer. The system may include a host server remotely located from the fueling station that performs consumer card authorizations and records purchase transactions. A plurality of dispenser controllers are located at the fueling station, and each of the dispenser controllers is associated with and controls one of the plurality of dispensers. Each of the dispenser controllers includes a network connection to the host server for passing consumer card authorization requests and purchase transaction data to the host server, and for receiving consumer card authorizations from the host server. The controllers also include an interface with the means for dispensing fuel and an interface with the means for accepting payment from the customer. Thus, a failure of a single dispenser controller affects only the fuel dispenser associated with the failed controller.

In another aspect, the present invention is directed to a system for controlling an automated fueling station that includes an Internet Protocol (IP)-based network that interconnects a plurality of fuel dispensers at the fueling station and a plurality of dispenser controllers. The IP-based network provides inter-connectivity between any one of the dispenser controllers and any one of the fuel dispensers. The system also includes a plurality of fuel dispensers. Each of the dispensers includes means for dispensing fuel, means for accepting payment from a customer, and signal conversion means for converting internal signaling protocols to an IP-based signaling protocol, and for connecting the fuel dispensers to the IP-based network. The system also includes a plurality of dispenser controllers for controlling the plurality of fuel dispensers. Each of the dispenser controllers includes an interface with the IP-based network; means for sending control signaling through the IP-based network to the means for dispensing fuel; means for sending control signaling through the IP-based network to the means for accepting payment from a customer; and a network connection to an external data network. A host server may be remotely located from the fueling station, and may be connected to each of the plurality of dispenser controllers through the external data network. The host server performs consumer card authorizations and records purchase transactions. Alternatively, a local card file may be maintained at the fueling station, and may be accessed by the dispenser controllers to authorize consumer card transactions.

In yet another aspect, the present invention is directed to a method of controlling an automated fueling station having a plurality of fuel dispensers and a corresponding plurality of dispenser controllers, each of the dispensers including means for dispensing fuel and means for accepting payment from a customer. The method includes the steps of associating each fuel dispenser at the fueling station with a corresponding dispenser controller; interfacing each dispenser controller with the means for dispensing fuel in the associated fuel dispenser; and interfacing each dispenser controller with the means for accepting payment in the associated fuel dispenser. The method may also include connecting each of the dispenser controllers to a remote host server via an external network connection; sending consumer card authorization requests and purchase transaction data from the plurality of dispenser controllers to the host server; performing consumer card authorizations and recording the purchase transaction data by the host server; and sending consumer card authorizations from the host server to the plurality of dispenser controllers.

In yet another aspect, the present invention is directed to a method of controlling an automated fueling station. A plurality of fuel dispensers are provided that include means for dispensing fuel and means for accepting payment from a customer. Internal signaling protocols in each dispenser are converted to an Internet Protocol (IP)-based signaling protocol, and each fuel dispenser is connected to an IP-based network. The method also includes providing a plurality of dispenser controllers for controlling the plurality of fuel dispensers; connecting each dispenser controller to the IP-based network; sending control signaling from each dispenser controller through the IP-based network to the means for dispensing fuel in an associated fuel dispenser; and sending control signaling through the IP-based network to the means for accepting payment in an associated fuel dispenser. The method may also include connecting each of the dispenser controllers to a remote host server via an external network connection; sending consumer card authorization requests and purchase transaction data from the plurality of dispenser controllers to the host server; performing consumer card authorizations and recording the purchase transaction data by the host server; and sending consumer card authorizations from the host server to the plurality of dispenser controllers.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
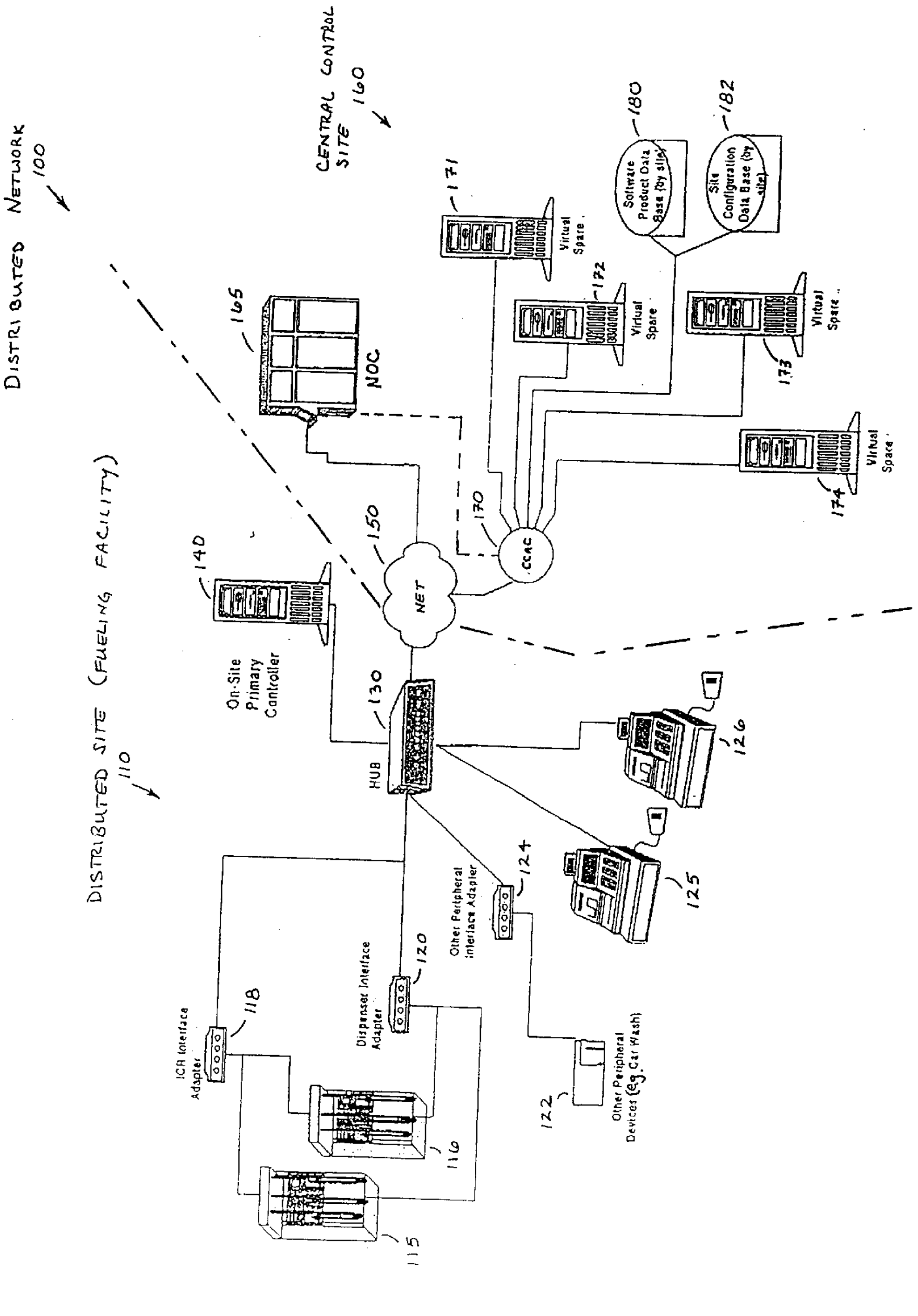
FIG. 1 is a simplified block diagram of a fueling station and central control site having a plurality of virtual spare dispenser controllers illustrating one aspect of the present invention.

The present invention is a system and method of controlling an automated fueling station. The invention increases the availability of automated fuel dispensers through the use of a distributed data network and a method of rapidly and efficiently backing up distributed controllers in the network. The invention utilizes Internet technology to reduce the site downtime by facilitating the rapid configuration and connection of a backup controller. The turnaround time is reduced to several minutes as opposed to several hours or days. The invention would enable the site to continue operations while a technician is dispatched to the site for troubleshooting and repair of the failed site controller. In addition, by distributing controllers for each dispenser at the site, even if a controller fails and no backup is available, only a single dispenser is affected, not the entire site.

All of the distributed sites in a distributed data network are connected to a central controller via, for example, the Internet or a private IP-based intranet. The solution includes a router, switch, hub, or other signal conversion device at each site that preferably includes an interworking function (IWF) for interfacing non-IP site devices with the IP-based data network. The site devices are connected to the router which in turn connects to the site controller. The router, in turn, is connected through the IP data network to the central controller. The central controller is connected to a database of configuration data for each distributed site, and to a plurality of backup controllers that may be located, for example, at a help desk.

The router may include means for detecting a failure of the site controller, or the failure may be detected by the central controller. For example, the site controller may send a periodic "heartbeat" signal to the central controller indicating that it is operating normally. If the heartbeat signal stops, the central controller sends an indication to the router that the site controller has failed. Alternatively, an operator at the site may call a central help desk and report the site controller failure.

Upon detection of a failure of one of the site controllers, a notice is sent to a remote help desk which includes a rack of spare site controllers and a database of site configurations. A spare site controller is selected and configured with the configuration of the troubled site. The site router at the troubled site is then reconfigured to connect the spare site controller at the remote help desk to the troubled site. The spare site controller then takes over as the site controller while the faulty controller is repaired or replaced.

In the preferred embodiment of the present invention, the invention is described in the context of the fueling industry in which a distributed network controls a plurality of automated service stations. These automated 'self-service' stations allow customers to dispense their own fuel, but may in fact be fully or only partially automated. Each station has a PC which functions as a site controller. Other site devices, with serial interfaces to the PC, include such devices as gasoline dispensers, island card readers, and payment system dial modem interfaces. A failure in the PC causes the router to convert the serial interface data from the site devices to IP packets, and route the packets over the data network to a backup PC which has been configured by the central controller to replace the site PC while it is being repaired.

FIG. 1 is a simplified block diagram of a fueling station and central control site having a plurality of virtual spare dispenser controllers illustrating one aspect of the present invention. In this embodiment, distributed network 100 includes distributed site 110, here an automated fueling facility, and central control site 160. While for illustration they are separated by a broken line, there is no physical or distance separation requirement. (In one alternative embodiment, for example, the central control site and one of several distributed sites in the distributed network may exist at the same location, or even use the same computer.) For clarity, only a central control site and one automated fueling facility are illustrated in FIG. 1, though there could be (and usually are) numerous distributed sites, and possibly two or more control sites. Communications are accomplished over a data-communications network 150, which is often the Internet or a wide-area network (WAN), but could be any other suitable network such as an intranet, extranet, or virtual private network (VPN).

Fueling facility 110 includes fuel dispensers 115 and 116, from which consumers can dispense their own fuel. Such fuel dispensers typically have an Island Card Reader (ICR) (not shown) that allows purchasers to make payment for the fuel they receive through the use of a consumer card such as, for example, a credit or debit card. An ICR interface 118 handles communications to and from the ICRs located on dispensers 115 and 116 so that credit or debit purchases can be authorized and the appropriate account information gathered. The dispensers 115 and 116 themselves communicate through dispenser interface 120, for example, to receive authorization to dispense fuel or to report the quantity sold.

On-site primary controller 140 is a PC or other computing facility that includes operational software and data storage capabilities in order to be able to manage site operations. Site operations may include not only fuel dispensing but related peripheral services as well, such as a robotic car wash. For illustration, car-wash controller 122 is shown communicating through peripheral interface 124. Communication with separate automated devices, such as a car wash, may be desirable, for example to allow payment to be made through an ICR at the dispenser, or to adjust the price charged based on other purchases already made. Point-of-sale (POS) terminals 125 and 126 are stations for use by a human attendant in totaling and recording sales, making change, and preforming credit card authorizations, and may be used for inventory control as well.

Each of the site components (and any others that may be present), communicate directly or indirectly with on-site primary controller 140 and each other though hub 130. Hub 130 is an on-site router that directs data traffic, typically serial communications between the various on-site components. Generally, the hub 130 will receive a communication, determine where it should be sent, and effect transmission when the addressed device is ready to receive it. In addition, hub 130 is connected to data network 150 so that the distributed site 110 can communicate with the central control site 160. Note that this connection can be permanent or ad hoc, as desired.

In this embodiment, the network operations controller (NOC) 165, located at central control site 160, manages and supervises the operations of distributed site 110 and the other distributed sites in the network 100. For example, an owner may want to centrally manage a number of distributed fueling facilities. Certain operations, such as accounting and inventory control, may be efficiently done at this control center, although the specific allocation of management functions may vary according to individual requirements.

Also in communication with data communications network 150 is a central control accounting center (CCAC) 170 that acts as a hub or router, when necessary, to effect communications in accordance with the present invention, as explained more fully below. In this capacity, CCAC 170 handles communications between network 150 and virtual spares 171, 172, 173, and 174. These virtual spares are backup controllers that can be brought into use when one of the on-site primary controllers, such as on-site controller 140, is down for maintenance. CCAC 170 may also be connected directly (as shown by the broken line) to NOC 165, which in a preferred embodiment is located at the same site as the CCAC.

The on-site controllers in distributed network 100 need not be, and very often are not, identical or identically configured. Software product database 180 is used for storing information related to what software is resident on each on-site controller. Likewise, site configuration database 182 similarly maintains a record of the configuration parameters currently in use for each on-site controller in distributed network 100. (Although two configuration-information databases are shown in this embodiment, more or less could be present, and the nature and quantity of the configuration information stored there may of course vary from application to application.) Databases 180 and 182 are accessible though CCAC 170, through which they are populated and through which they are used to configure a virtual spare (as explained more fully below).

Note that even though system components of FIG. 1 are illustrated as separate physical entities, they can also be combined in one machine that is logically separated into a number of components. And as long as they can be placed in communication with the other system components as contemplated by the present invention, there is no requirement that they co-occupy the same machine, physical location, or site.

Figure 2:
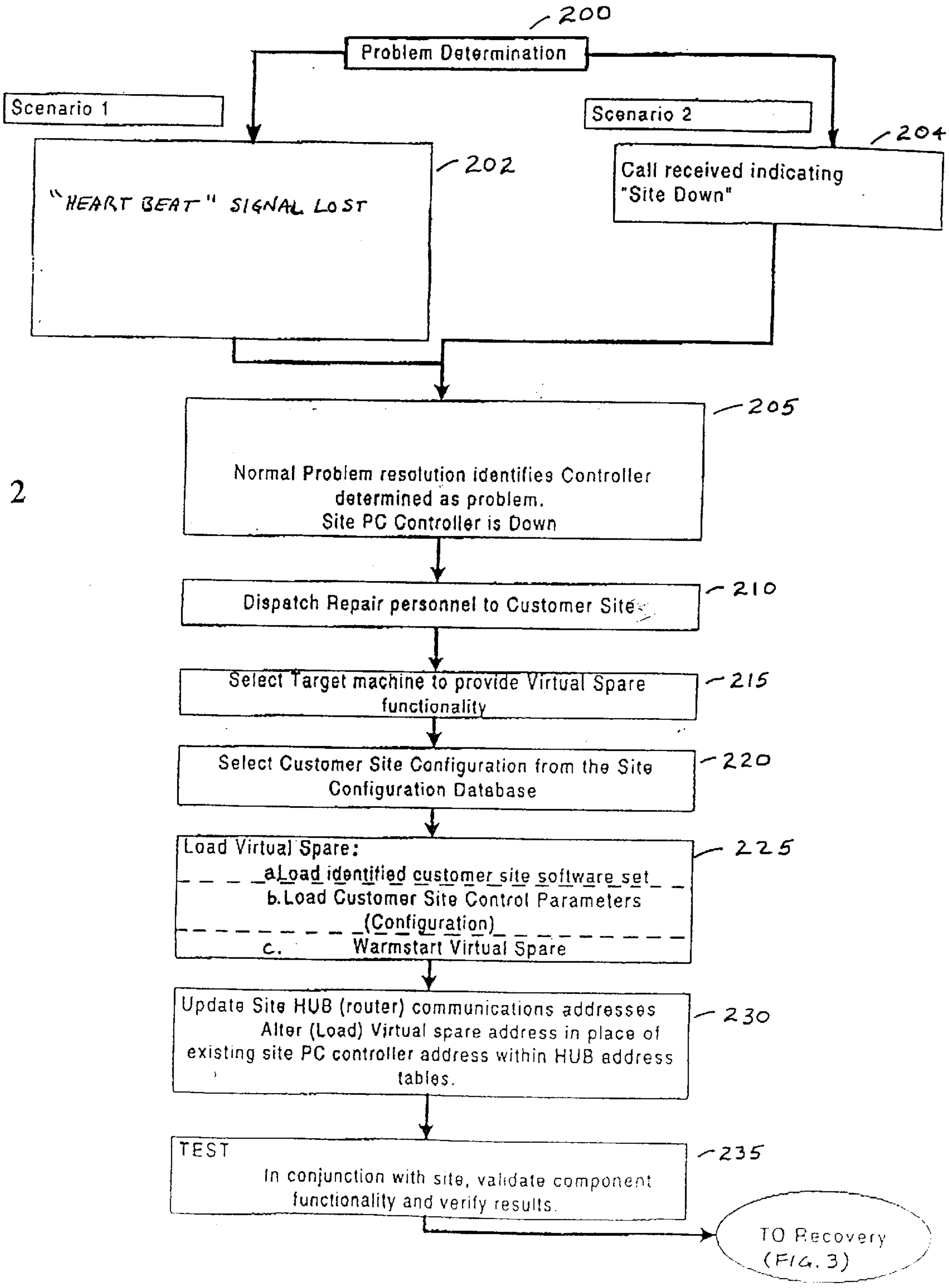
FIG. 2 is a flow chart illustrating the steps of the method of the present invention when bringing a spare controller on line.

FIG. 2 is a flow chart illustrating the steps of the method of the present invention when bringing-up a spare controller, for example virtual spare 171 shown in FIG. 1. (Note that no exact sequence is required, and the steps of the method of the present invention, including those of the illustrated embodiment, may be performed in any logically-allowed order.) The method begins with step 200, problem determination. This determination may occur in a variety of ways, two of which are shown in FIG. 2. In a first scenario, the problem determination includes the failure to receive a status message (sometimes called a ‘heartbeat’) that during normal operations is regularly transmitted by a properly functioning site controller (step 202). In a second scenario, a ‘site-down’ call is received (step 204) at the central control site 160, often from an attendant at the distributed site 110. Note that a system or method embodying the present invention need not include the capability to perform both scenarios, although in some circumstances both may be desirable.

The method then moves to step 205, where the system, and preferably NOC 165, makes a determination of which site controller is down and whether back-up or repair is required. Normally, at this point corrective action will be initiated to recover the failed site controller, which often involves dispatching repair personnel to the site (step 210). Also at this time, a target machine to provide virtual-spare functionality is selected (step 215), such as virtual spare 171 shown in FIG. 1. This selection is generally based on availability, but may be based on suitability for a particular situation or other factors as well. Reference is then made to the software product database 180 and the site configuration database 182 (step 220), to identify the software and parameters related to the down on-site controller identified in step 205. The virtual spare is then prepared (step 225). The distributed site software set is loaded from software product database 180 (step 225*a*), the site configuration parameters are loaded from site configuration database 182 (step 225*b*), and the virtual spare is then warm-started (step 225*c*).

Note that in a preferred embodiment, the NOC 165, upon being notified (or otherwise determining) that a virtual spare is required, selects the appropriate spare for use according to a predetermined set of criteria, and then initiates and supervises the virtual-spare configuration process. In another embodiment, some or all of these functions may be instead performed by hub 130, or by another component (for example one dedicated for this purpose).

In order to place the virtual spare ‘on-line’, the communication address tables in the on-site hub 130 must be updated so that the address of virtual spare 171 replaces that of on-site controller 140 (step 230). (The address of virtual spare 171 may include the address of CACC 170, which will receive messages sent to virtual spare 171 and route them appropriately.) At this point, all communications from the components at distributed site 110 that would ordinarily be directed to the on-site controller 140 are now routed to virtual spare 171. Virtual spare 171 now functions in place of the on-site controller 140, having been configured to do so in step 225. Note that although not shown as a step in FIG. 2, it may be necessary for hub 130 to perform a protocol conversion when routing data through network 150 instead of on-site controller 140. Typically, this means converting serial transmissions to TCP/IP format, but could involve other procedures as well. In a preferred embodiment, an interworking function is resident on hub 130 for this purpose. Finally, the configuration now in place is tested to ensure correct functionality (step 235), and any necessary adjustments made (step not shown). The virtual spare 171 continues to function for on-site controller 140 until the necessary maintenance is completed and recovery begins. Note that the site controller outage (whether caused by a failure or the need for system maintenance) may be total or partial. Therefore the spare controller may not be required to assume all site-controller functions in order to manage operations of the on-site equipment during the outage (either because the failure was not total or because complete assumption is not necessary or desired). Note also that as used herein, the terms "back up" and "backing up" refer to replacing some or all controller functionality according to the system and method described, and not merely to the process of making a "backup" copy of software, or of database contents (although copies of software and data may certainly be useful while practicing the invention).

Figure 3:
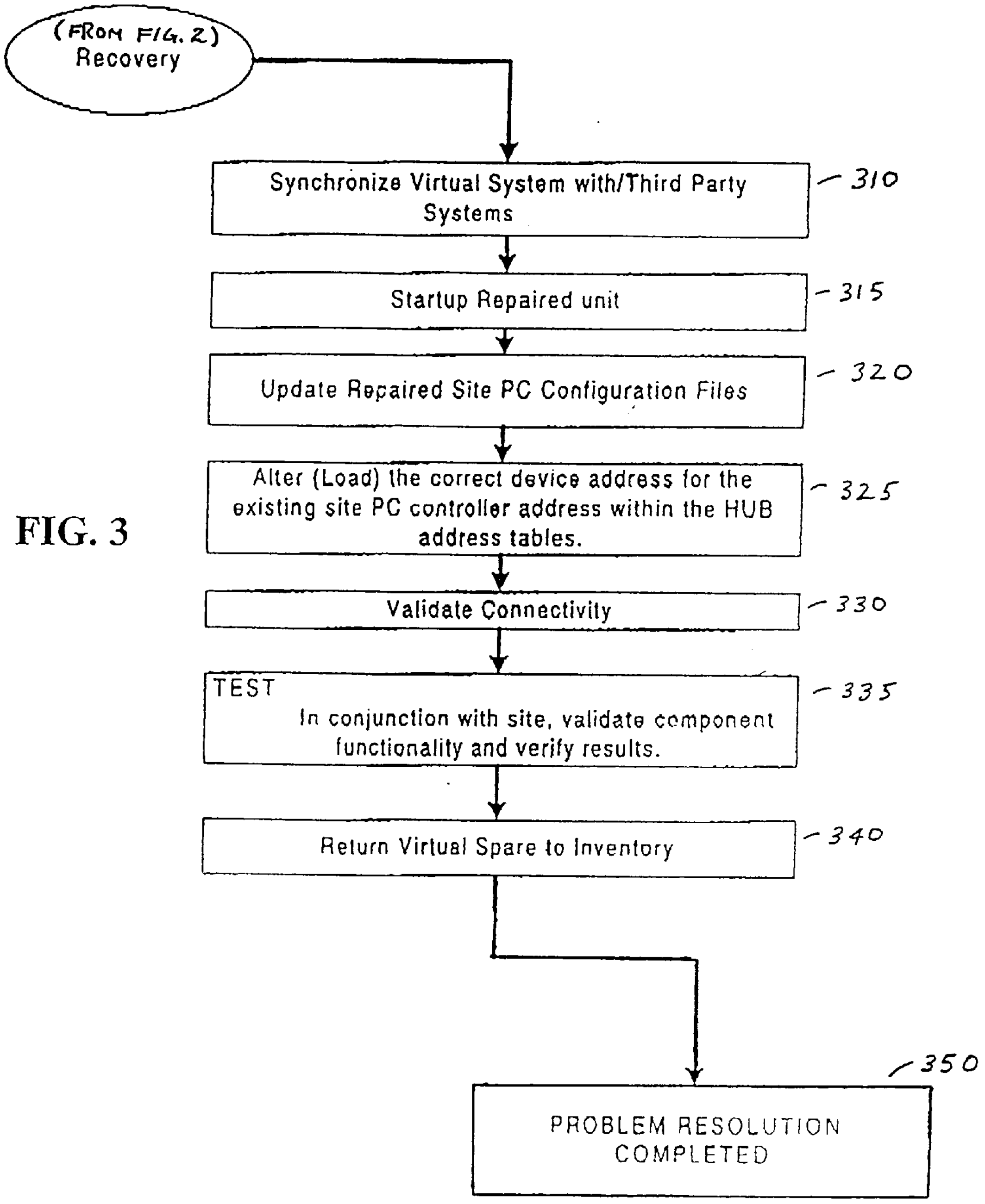
FIG. 3 is a flow chart illustrating the steps of a recovery process when a repaired site controller is brought back on line.

FIG. 3 is a flow chart illustrating the steps of a recovery process according to an embodiment of the present invention, where a repaired on-site controller is brought back on-line. The recovery process follows from process of FIG. 2 (or an equivalent method), where a virtual spare is bought in as a backup. First, the virtual system is synchronized with the third-party systems (step 310). For example, if virtual spare 171 has been functioning for on-site controller 140, virtual spare 171 performs the end-of-day (EOD) synchronization that would ordinarily have been done by the controller 140, such as balancing accounts, storing data, transmitting reports to the network operator or to third-party financial institutions. Any discrepancies found may then be addressed in the usual manner before the (now-repaired) controller 140 is brought back on-line. The repaired unit, such as on-site controller 140, is started-up (step 315). Since it has been down for a time, the repaired controller's configuration files are updated (step 320), as necessary. It is then ready to be placed back into operation, so the router address tables are altered to change the routing address for relevant communications from the virtual spare 171 address back to the on-site controller 140 address (step 325).

To ensure that the repaired site controller can perform its normal function, its connectivity to the network is validated (step 330), and the functionality of the on-site controller itself is also validated (step 335). Once the results of this test are verified, the virtual spare 171 is returned to inventory (step 340), that is, made available for other tasks. The process is finished at step 350, where the problem resolution has been achieved with a minimum of interruptions to normal system operations. Again, while in a preferred embodiment, the NOC 165 directs the process of restoring the site controller to service, this function may also be performed by hub 130, another system component, or shared.

Figure 4:
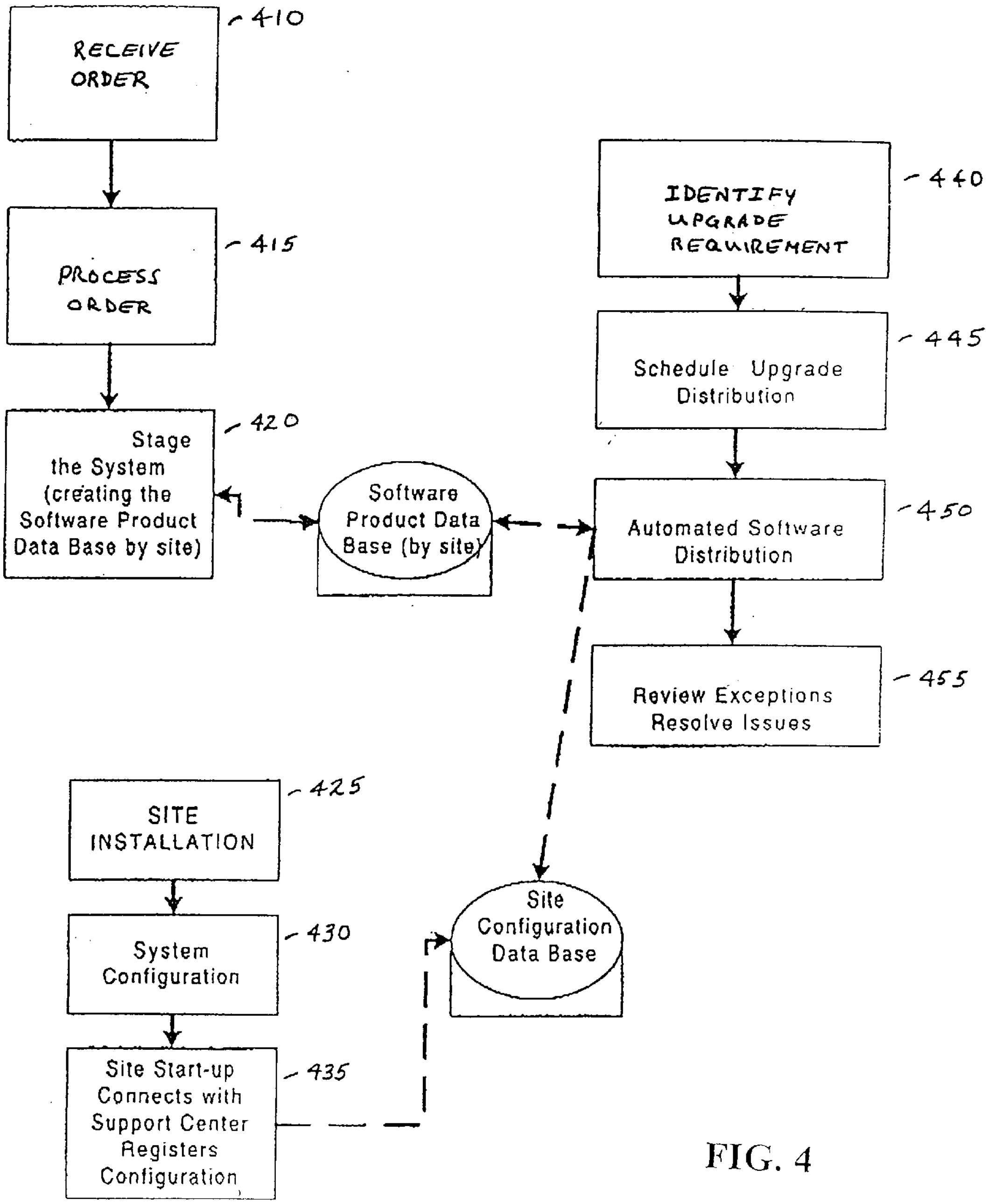
FIG. 4 is a flow chart illustrating the steps of database population in accordance with a method of the present invention.

FIG. 4 is a flow chart illustrating the steps of database population in accordance with a method of the present invention. The system and method of the present invention depend on prior creation of the appropriate database records, since by definition the rapid-and-efficient backup will be required when the site controller is unavailable and cannot provide the information needed to correctly configure a spare. An exception occurs in the case of a planned outage. Since it is in that case known when the site controller will be taken out of service, the virtual spare can be configured from a database created especially for the planned outage, or even directly from the still-operational site controller itself. Since premature failure of a site controller cannot be completely avoided, however, the preferred method remains the population of software product database 180 and the site configuration database 182 at the time the site is installed, or modified, as shown in FIG. 4.

The process of FIG. 4 begins with receiving an order for a new network of distributed sites (step 410). After the order is processed (step 415), the new site system is staged, and the software product database by site is created (step 420). At site installation, step 425, where the actual hardware is put into place and connected, for example as shown by the fueling facility 110 of FIG. 1. The installed site system is configured (step 430), and the site controller is then started-up and registers its configuration in the site configuration database (step 435).

System upgrades are populated in like fashion. When the need for an upgrade is identified (step 440), usually based on a customer request, the distribution of the upgrade software is scheduled (step 445). When ready, the system automatically distributes the software to the site controllers and updates the software product database to reflect the new site configuration (step 450). A system review process is then initiated to review exceptions and resolve issues (step 455). Any resulting changes affecting site configuration are added to the site configuration database (step not shown).

Figure 5:
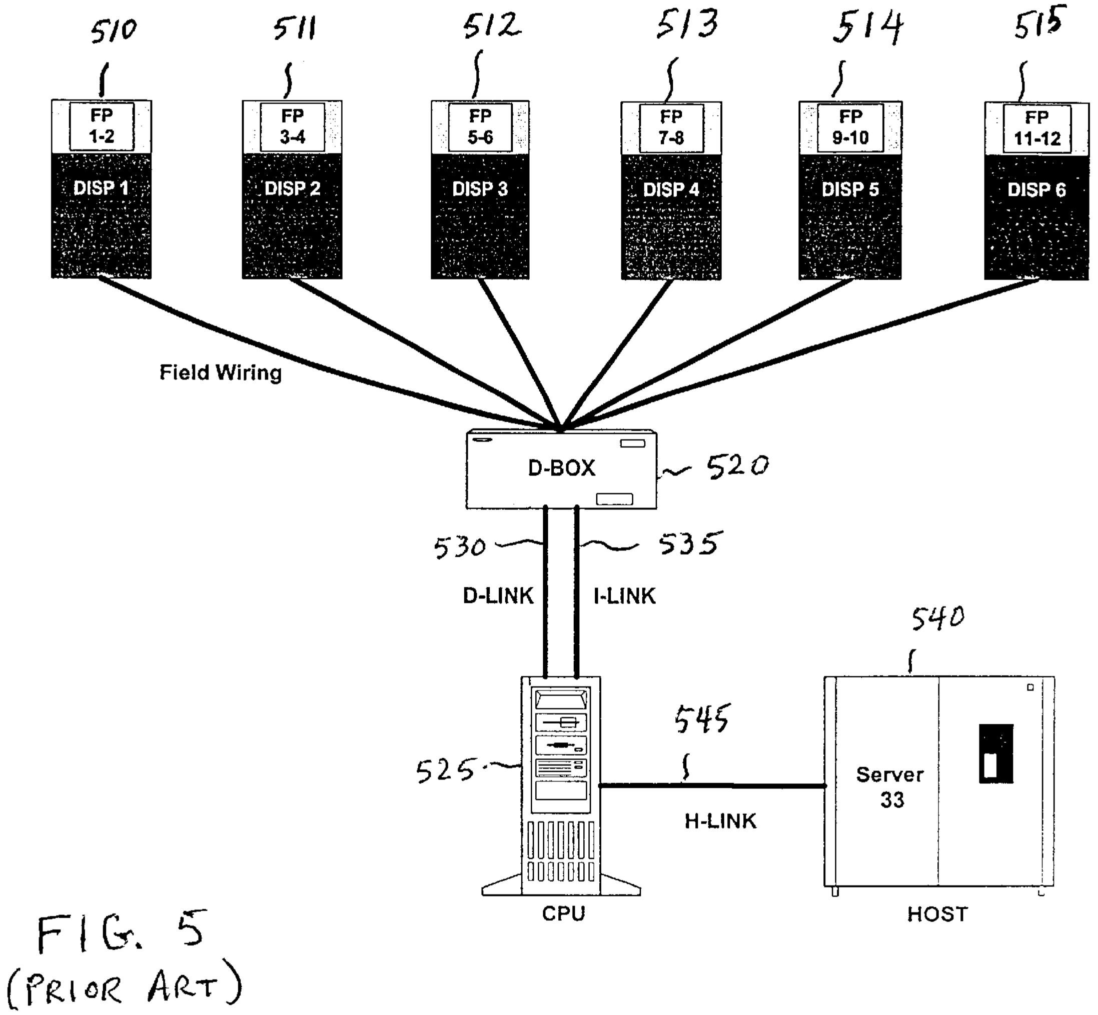
FIG. 5 (PRIOR ART)
FIG. 5 (Prior Art) is a simplified block diagram of an existing controller configuration at a typical retail fueling station.

FIG. 5 is a simplified block diagram of an existing controller configuration at a typical retail fueling station having six fuel dispensers 510–515. The six dispensers are connected through a Distribution Box (D-Box) 520 to a central CPU controller 525. The D-Box is an electrical signal concentrator and converter (hardware only) used to consolidate dispenser control signals (via field wiring) into one or more serial channels. The D-Box provides field wiring termination, signal conversion, device isolation for maintenance and trouble shooting, and dissipation of high energy electrostatic discharges such as lightning. The physical interface between the D-Box and each dispenser is typically implemented with two distinct pairs of wires, one dedicated to the fuel dispenser, and the other dedicated to Island Card Reader (ICR) control. Each wire pair typically controls the fuel and payment processing for two logical fuel positions such as dispenser positions 1 and 2. The dispenser and ICR physical interfaces are typically supported by Active Current Loop (30–45 ma) and RS-422/485 controlled transmitter circuits.

The CPU controller runs application programs that provide automated fuel transactions. The connection between the D-Box and the CPU controller comprises a D-Link 530 and an I-Link 535. The D-Link is a serial connection that enables the application programs in the controller to implement and maintain a dispenser message level protocol. The I-Link is a serial connection that enables the application programs to implement and maintain ICR message level protocols.

The central CPU controller 525 is connected remotely to a Host Server 540 via an H-Link 545. The Host Server provides all card processing and data capture services to the application programs running on the CPU controller 525.

The H-Link is typically a fiber optic cable providing an Ethernet connection between the controller and the Host Server for the purposes of consumer card authorization, transaction capture, and various administrative functions. As can be readily recognized, the H-Link, central CPU controller, and D-Box are all single points of failure affecting all six of the dispensers.

Figure 6:
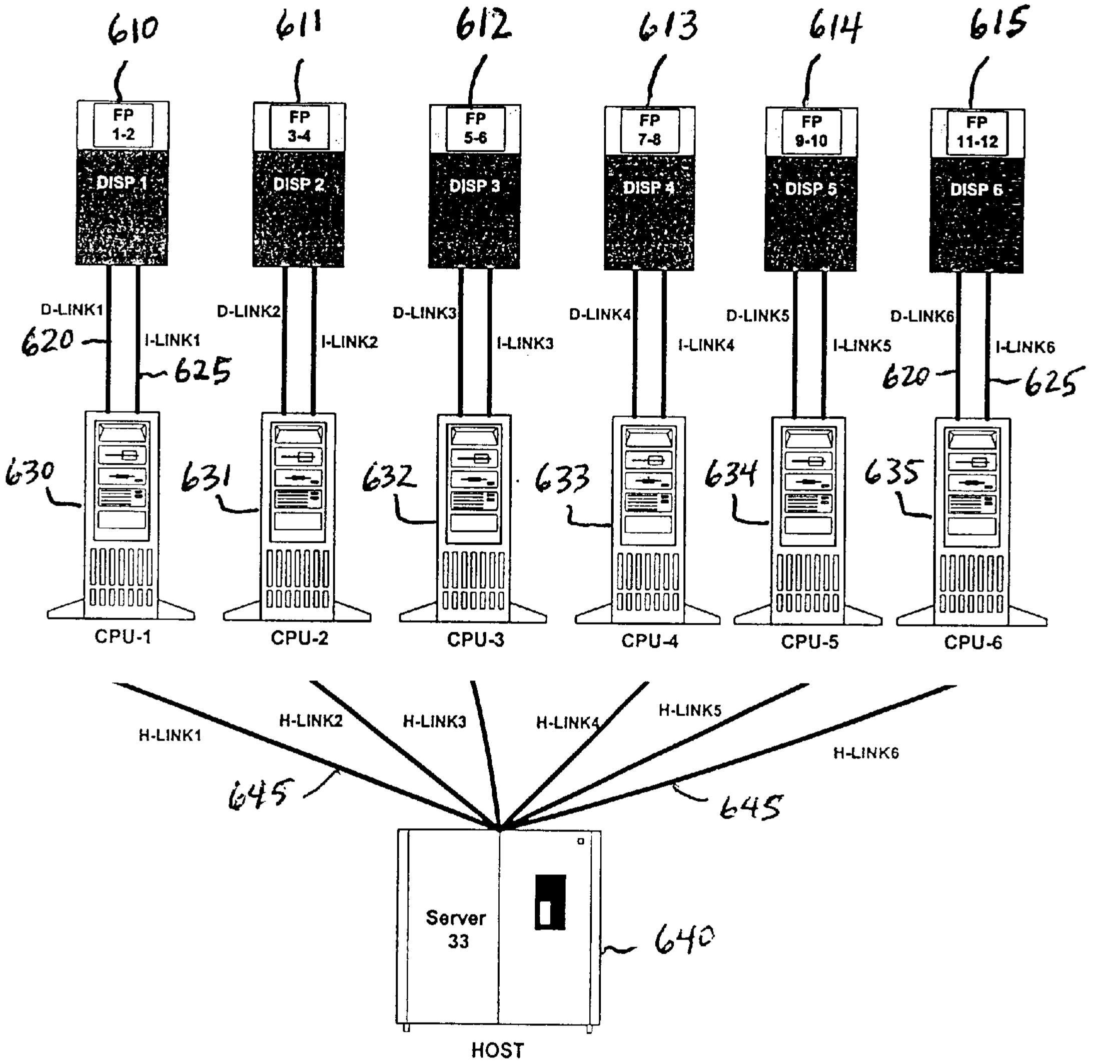
FIG. 6 is a simplified block diagram of a first embodiment of the controller configuration of the present invention when implemented at a retail fueling station.

FIG. 6 is a simplified block diagram of a first embodiment of the controller configuration of the present invention when implemented at a retail fueling station having six fuel dispensers 610–615. Each of the six dispensers is connected via a D-Link 620 and an I-Link 625 to one of six dedicated CPU controllers 630–635. The D-Link is a serial connection that enables the application programs in the controller to implement and maintain a dispenser message level protocol for controlling the fueling operation of the dispenser. The I-Link is a serial connection that enables the application programs to implement and maintain ICR message level protocols for controlling the island card reader and accepting customer payment for the fuel. Note that each of the dedicated CPU controllers may be physically implemented within each of the fuel dispensers. In this configuration, the D-Link and I-Link connections are internal to the dispenser, and only the H-Link is managed externally. The H-Link may also be implemented using wireless technology, therefore reducing the external connections from the dispenser to AC power only. Alternatively, the CPU controllers may be implemented in an array of controllers at another physical location external to the dispensers. For example, multiple CPU controllers may be rack-mounted in an air-conditioned kiosk with a single monitor, keyboard and mouse connections.

As noted above, the dispenser and ICR physical interfaces are typically supported by Active Current Loop (30–45 ma) and RS-422/485 controlled transmitter circuits. These physical interfaces are not readily available for PCs, and thus are typically managed externally to the CPU controllers. In one embodiment of the present invention, the signal conversion functionality that was previously performed in the D-Box is performed in the CPU controllers.

Each of the dedicated CPU controllers, in turn, is connected to a Host Server 640 via one of a plurality of H-Links 645. The H-Links may be, for example, wireless communication links or fiber optic cables providing an Ethernet connection between each of the dedicated controllers and the Host Server for the purposes of consumer card authorization, transaction capture, and various administrative functions. Thus, in the present invention, the prior art dispenser field wiring is eliminated, the D-Box is eliminated, and a plurality of H-Links and dedicated CPU controllers have replaced the single points of failure that adversely affected all of the dispensers at the site in the prior art architecture. In the architecture of the present invention, if an H-Link or CPU controller fails, and a backup is not available, only a single dispenser is affected.

Each of the dedicated CPU controllers 630–635 is also modified to accept price file updates in order to support fuel price changes and other administrative reporting functions. Each of the individual CPU controllers is also remotely accessible by service personnel for purposes of system maintenance and software upgrades. Additional Ethernet and USB interfaces should provide adequate capacity for future serial port expansion.

In very large networks such as those operated by the major oil companies, CPU controllers may be moved fairly often between sites. Therefore, a configuration database must be maintained to keep track of the physical location of each controller. Management of the configuration database is a largely manual operation, and therefore is subject to mistakes being made. Thus, it is possible that when an identification number of a failed CPU controller is reported to the central control site 160, the configuration database may indicate an incorrect site as the site of the failed controller. In this case, a technician may be sent to the indicated site, only to find that the reported CPU controller is not there.

Figure 7:
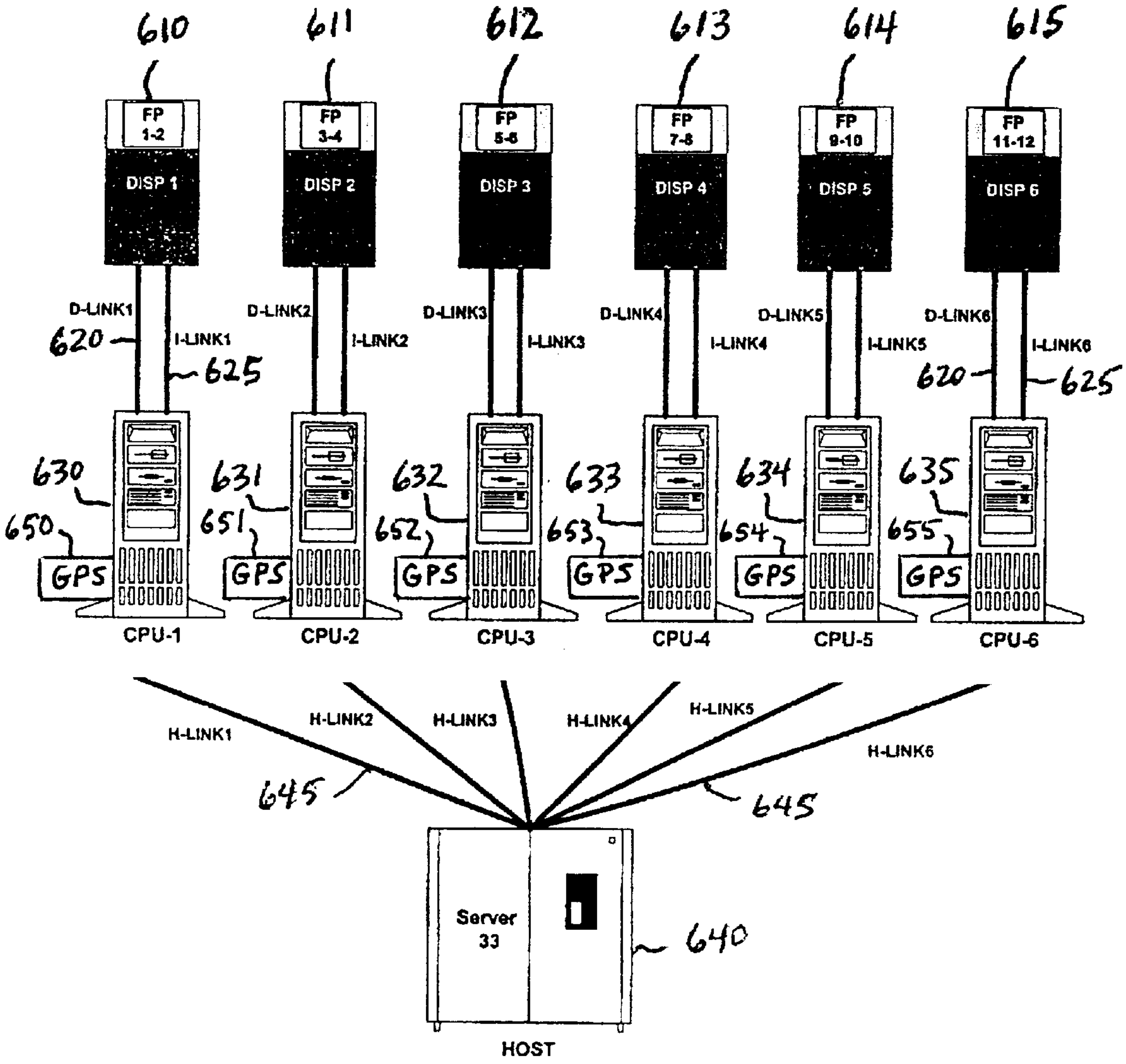
FIG. 7 is a simplified block diagram of a second embodiment of the controller configuration of the present invention when implemented at a retail fueling station.

FIG. 7 is a simplified block diagram of a second embodiment of the controller configuration of the present invention which solves this problem by installing a Global Positioning System (GPS) receiver 650–655 with each CPU controller 630–635. Each GPS receiver receives signals transmitted from at least four GPS satellites and calculates a precise location for the receiver. This location information is then sent over the H-Link 645 to the host server 640. Thereafter, if a CPU controller fails, the physical location of the failed controller can be ascertained from the data received from the failed controller's associated GPS receiver.

Figure 8:
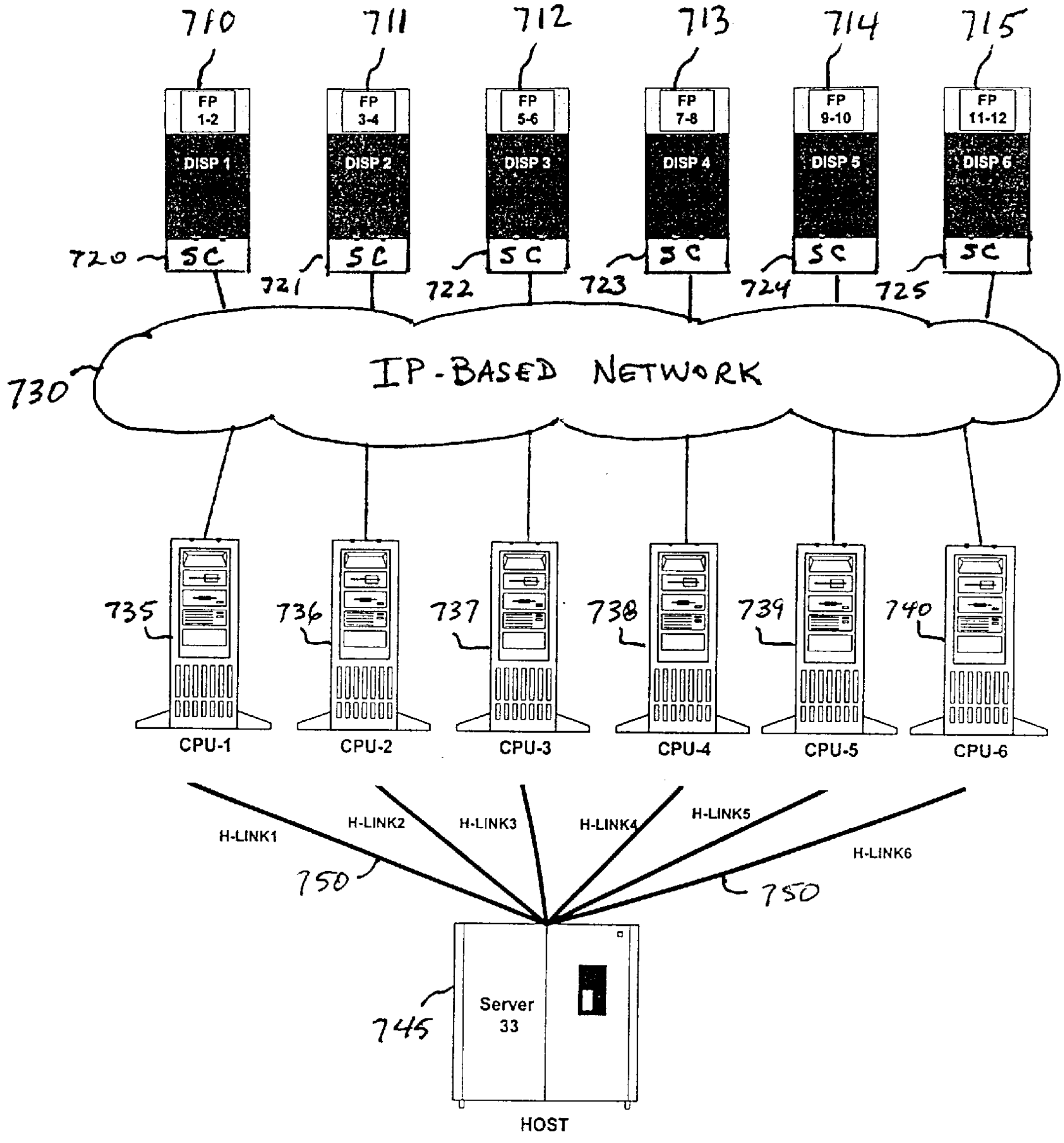
FIG. 8 is a simplified block diagram of a third embodiment of the controller configuration of the present invention when implemented at a retail fueling station.

FIG. 8 is a simplified block diagram of a third embodiment of the controller configuration of the present invention when implemented at a retail fueling station having six fuel dispensers 710–715. In this embodiment, each of the fuel dispensers includes a Signal Converter (SC) 720–725 that converts the Active Current Loop and RS-422/485 controlled transmitter circuits utilized for the D-Link and I-Link signaling into an Internet Protocol (IP)-based protocol such as Transaction Control Protocol/Internet Protocol (TCP/IP). Each of the dispensers then connects directly to an IP-based, connectionless packet data network 730. Each of the CPU controllers 735–740 also connects to the IP-based network, providing inter-connectivity between any one of the dispenser controllers and any one or more of the fuel dispensers. With appropriate addressing, any of the CPU controllers can thus communicate with and control any dispenser or combination of dispensers.

As in the first and second embodiments illustrated in FIGS. 6 and 7, each of the CPU controllers 735–740 may be connected to a Host Server 745 via one of a plurality of H-Links 750. The H-Links may be wireless communication links or fiber optic cables providing an Ethernet connection between each of the dedicated controllers and the Host Server for the purposes of consumer card authorization, transaction capture, and various administrative functions. Through the H-Link, the Host Server knows at any point in time, the status of each CPU controller, and whether each controller is currently idle or engaged in a fueling transaction. For example, the Host Server may receive periodic "heartbeat" signals from the CPU controllers, and thus may determine that a controller has failed when the heartbeat signal is not received.

In this embodiment, the CPU controllers may be unassigned until a customer begins a fueling transaction. At that time, an idle controller is assigned to the customer's fuel dispenser. Alternatively, each of the CPU controllers may be associated with a particular fuel dispenser, and the interconnectivity of the IP-based network 730 may be utilized to switch controllers only if a controller fails. If any CPU controller fails, the Host Server 745 may reroute the IP signaling from any other controller to the dispenser associated with the failed controller. The controller software in each CPU controller is capable of controlling one or all of the dispensers simultaneously. Therefore, multiple redundancy is provided through multiple on-site backup controllers.

Figure 9:
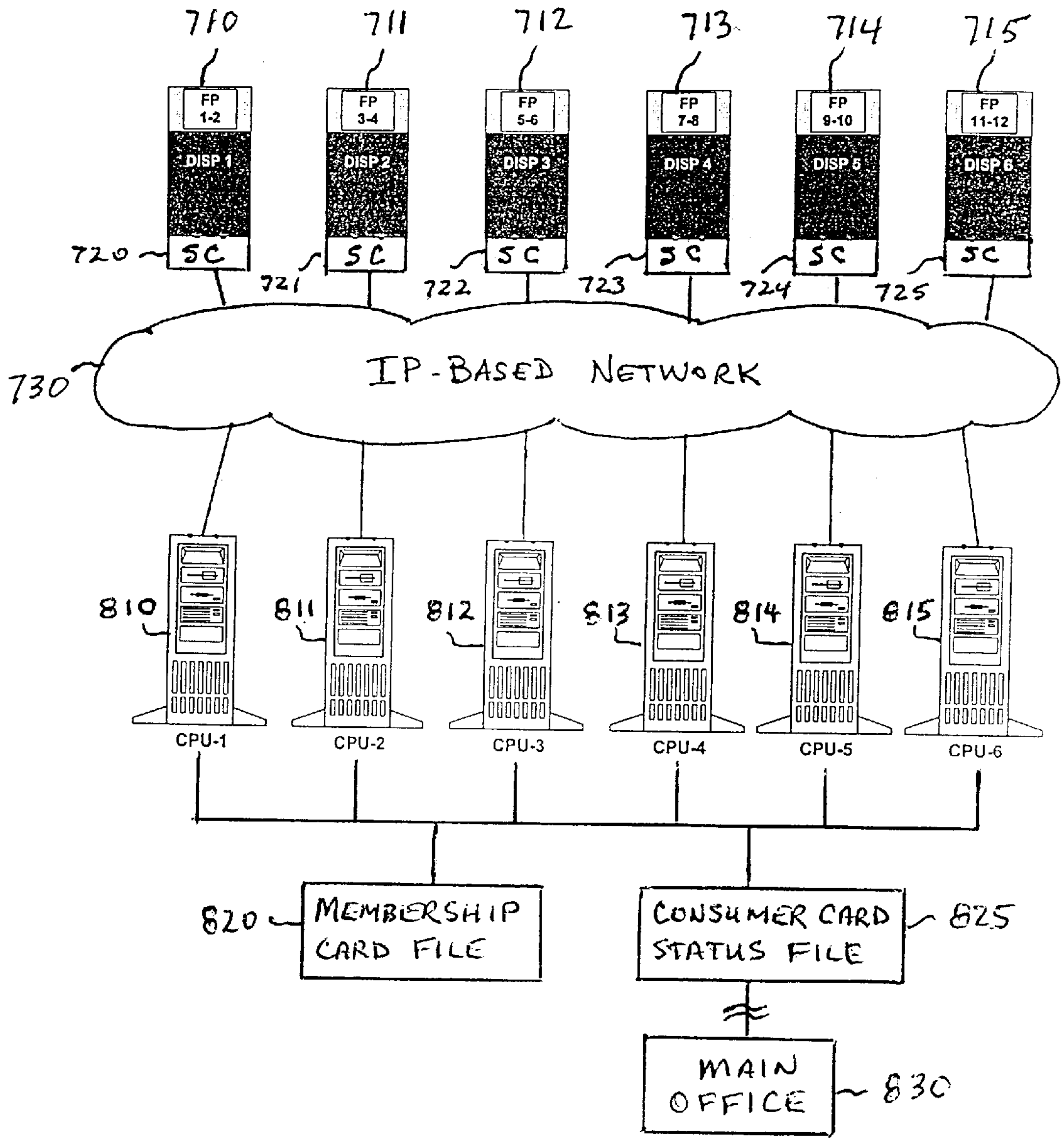
FIG. 9 is a simplified block diagram of a fourth embodiment of the controller configuration of the present invention when implemented at a retail fueling station.

FIG. 9 is a simplified block diagram of a fourth embodiment of the controller configuration of the present invention when implemented at a retail fueling station having six fuel dispensers 710–715. Like the configuration of FIG. 8 above, each of the fuel dispensers includes a Signal Converter (SC) 720–725 that converts the Active Current Loop and RS-422/485 controlled transmitter circuits utilized for the D-Link and I-Link signaling into an IP-based protocol such as TCP/IP. Each of the dispensers then connects directly to the IP-based packet data network 730. Each of the CPU controllers 810–815 also connects to the IP-based network, providing inter-connectivity between any one of the dispenser controllers and any one or more of the fuel dispensers. With appropriate addressing, any of the CPU controllers can thus communicate with and control any dispenser or combination of dispensers.

In the alternative configuration of FIG. 9, the unattended fueling station may operate without a connection to a remote host server. In this configuration, the functions performed by the remote host in other configurations are performed on site by the CPU controllers 810–815. Each of the CPU controllers can perform consumer card authorizations and record transactions for later download. In one method of card authorization, consumers first swipe a membership card through the ICR at the dispenser. The CPU controller recognizes the membership number encoded on the card from a membership card file 820, and authorizes the sale which may be charged to a membership account. Alternatively, after the CPU controller recognizes the membership number, the customer may swipe a consumer credit or debit card through the ICR, and the CPU controller authorizes the sale based on its recognition of the membership number.

Alternatively, a local consumer card status file 825 may be downloaded to a database at the fueling site from a main office 830. When a customer swipes a consumer card through the ICR, the associated CPU controller checks the local card file to determine whether the sale should be authorized. If so, the controller activates the dispenser and records the transaction when completed.

It should be noted that even though the fueling station of FIG. 9 operates without a connection to a remote host server, the dispensers may still be connected to a central control system remotely located from the fueling station. As noted above, the central control system may include a spare controller configured to at least partially match the configuration of the CPU controllers at the fueling station. When a CPU controller fails at the station, the central control system may route communications between the spare controller and the fuel dispenser associated with the failed CPU controller.

Based on the foregoing description, one of ordinary skill in the art should readily appreciate that the present invention advantageously provides a system and method for distributing CPU controllers at a site and backing up the distributed controllers in a data network.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. A system for controlling an automated fueling station having a plurality of fuel dispensers, each of said dispensers including means for dispensing fuel and means for accepting payment from a customer, said system comprising:

a host server remotely located from the fueling station, said host server performing consumer card authorizations and recording purchase transactions;

a plurality of dispenser controllers located at the fueling station, each of said dispenser controllers being associated with and controlling one of the plurality of dispensers;

means for maintaining operation of remaining dispensers when a single dispenser controller fails, said means for maintaining operation comprising:

a network connection from each of the plurality of dispenser controllers to the host server for passing consumer card authorization requests and purchase transaction data to the host server, and receiving consumer card authorizations from the host server;

an interface between each of the plurality of dispenser controllers and the means for dispensing fuel in each controller's associated dispenser; and an interface between each of the plurality of dispenser controllers and the means for accepting payment in each controller's associated dispenser; and a central control system remotely located from the fueling station comprising:

a spare controller configured to at least partially match the configuration of the plurality of dispenser controllers at the fueling station;

means for determining when a dispenser controller at the fueling station fails; and a central hub for routing communications between the spare controller and the fuel dispenser associated with the failed dispenser controller, in response to a determination that the failed dispenser controller has failed.

2. The system for controlling an automated fueling station of claim 1 wherein each of the plurality of dispenser controllers is implemented within its associated fuel dispenser.

3. The system for controlling an automated fueling station of claim 2 wherein the network connection from the dispenser controller in each dispenser to the host server is a wireless communication link.

4. The system for controlling an automated fueling station of claim 1 wherein the plurality of dispenser controllers are implemented in a stand-alone kiosk physically separated from the dispensers.

5. The system for controlling an automated fueling station of claim 4 wherein the network connection from each dispenser controller in the kiosk to the host server is a wireless communication link.

6. The system for controlling an automated fueling station of claim 1 wherein each of the dispenser controllers includes signal conversion means for converting Active Current Loop and RS-422/485 controlled transmitter circuit signals into signals compatible with personal computers (PCs).

7. The system for controlling an automated fueling station of claim 1 wherein each of the dispenser controllers includes means for accepting price file updates in order to support fuel price changes.

8. The system for controlling an automated fueling station of claim 1 wherein each of the dispenser controllers includes means for providing remote access to service personnel through the network connection to the host server.

9. The system for controlling an automated fueling station of claim 1 wherein the central control system also includes:

a site-configuration database populated with information regarding the configuration of the dispenser controllers at the fueling station; and a central controller that accesses the site-configuration database and reconfigures the spare controller to at least partially match the configuration of the failed dispenser controller at the fueling station, in response to a determination that the failed dispenser controller has failed.

10. The system for controlling an automated fueling station of claim 1 further comprising means for determining a location of each of the plurality of dispenser controllers, said location determining means reporting the location of each dispenser controller to the host server.

11. The system for controlling an automated fueling station of claim 10 wherein the location determining means includes a plurality of Global Positioning System (GPS) receivers, each of said GPS receivers being associated with a different one of the plurality of dispenser controllers.

12. A system for controlling an automated fueling station, said system comprising:

an Internet Protocol (IP)-based network that interconnects a plurality of fuel dispensers at the fueling station and a plurality of dispenser controllers, said IP-based network providing inter-connectivity between any one of the dispenser controllers and any one of the fuel dispensers;

a plurality of fuel dispensers, each of said dispensers including:

means for dispensing fuel;

means for accepting payment from a customer; and signal conversion means for converting internal signaling protocols to an IP-based signaling protocol, and connecting the fuel dispensers to the IP-based network;

a plurality of dispenser controllers for controlling the plurality of fuel dispensers through the IP-based network;

means for maintaining operation of all dispensers when a single dispenser controller fails, said means maintaining operation of all dispensers being utilized if customers do not attempt to utilize all of the dispensers at one time, and said means maintaining operation of all dispensers being utilized except for a last dispenser if customers attempt to utilize all of the dispensers at one time, said means comprising:

an interface between each of the plurality of dispenser controllers and the IP-based network;

means for sending control signaling from each of the plurality of dispenser controllers through the IP-based network to any of the means for dispensing fuel;

means for sending control signaling from each of the plurality of dispenser controllers through the PP-based network to any of the means for accepting payment from a customer; and a network connection from each of the plurality of dispenser controllers to an external data network; and a host server remotely located from the fueling station and connected to each of the plurality of dispenser controllers through the external data network, said host server performing consumer card authorizations and recording purchase transactions.

13. The system for controlling an automated fueling station of claim 12 wherein the host server includes means for instructing any idle dispenser controller to connect to a selected dispenser when a customer begins a fueling transaction.

14. The system for controlling an automated fueling station of claim 13 wherein each of the dispenser controllers is associated with a particular fuel dispenser, and the host server includes:

means for determining that one of the plurality of dispenser controllers has failed; and means for instructing any idle dispenser controller to connect to the fuel dispenser associated with the failed dispenser controller.

15. The system for controlling an automated fueling station of claim 14 wherein each of the fuel dispensers includes means for informing the customer that the fueling transaction will be delayed when the customer begins the transaction and a dispenser controller is not available.

16. A method of controlling an automated fueling station having a plurality of fuel dispensers and a corresponding plurality of dispenser controllers, each of said dispensers including means for dispensing fuel and means for accepting payment from a customer, said method comprising the steps of:

associating each fuel dispenser at the fueling station with a corresponding dispenser controller;

interfacing each dispenser controller with the means for dispensing fuel in the associated fuel dispenser;

interfacing each dispenser controller with the means for accepting payment in the associated fuel dispenser;

connecting each of the dispenser controllers to a remote host server via an external network connection;

sending consumer card authorization requests and purchase transaction data from the plurality of dispenser controllers to the host server;

performing consumer card authorizations and recording the purchase transaction data by the host server;

sending consumer card authorizations from the host server to the plurality of dispenser controllers;

determining that a single dispenser controller has failed;

maintaining operation of all remaining dispenser controllers and fuel dispensers after the failure of the single dispenser controller;

providing a central control a system remotely located from, and in communication with, the fueling station, said central control system including a spare controller configured to at least partially match the configuration of the plurality of dispenser controllers at the fueling station; and routing by a central hub, communications between the spare controller and the fuel dispenser associated with the failed dispenser controller, in response to a determination that the failed dispenser controller has failed.

17. The method of controlling an automated fueling station of claim 16 wherein the step of connecting each of the dispenser controllers to a remote host server includes connecting each of the dispenser controllers to the remote host server via a wireless communication link.

18. A method of controlling an automated fueling station, said method comprising the steps of:

providing a plurality of fuel dispensers, each of said dispensers including means for dispensing fuel and means for accepting payment from a customer;

converting internal signaling protocols in each dispenser to an Internet Protocol (IP)-based signaling protocol and connecting each fuel dispenser to an IP-based network;

providing a plurality of dispenser controllers for controlling the plurality of fuel dispensers;

connecting each dispenser controller to the IP-based network;

sending control signaling from each dispenser controller through the IP-based network to the means for dispensing fuel in any of the fuel dispensers;

sending control signaling through the IP-based network to the means for accepting payment in any of the fuel dispensers;

connecting each of the dispenser controllers to a remote host server via an external network connection;

sending consumer card authorization requests and purchase transaction data from the plurality of dispenser controllers to the host server;

performing consumer card authorizations and recording the purchase transaction data by the host server;

sending consumer card authorizations from the host server to the plurality of dispenser controllers;

determining that a single dispenser controller has failed;

maintaining operation of all dispensers being utilized when the single dispenser controller fails, if customers do not attempt to utilize all of the dispensers at one time, and maintaining operation of all dispensers being utilized except for a last dispenser when the single dispenser controller fails if customers attempt to utilize all of the dispensers at one time.

19. The method of controlling an automated fueling station of claim 18 further comprising instructing by the host server, any idle dispenser controller to connect to any dispenser when a customer begins a fueling transaction.

20. A system for controlling an automated fueling station, said system comprising:

an Internet Protocol (IP)-based network that interconnects a plurality of fuel dispensers at the fueling station and a plurality of dispenser controllers, said IP-based network providing inter-connectivity between any of the dispenser controllers and any of the fuel dispensers;

a plurality of fuel dispensers, each of said dispensers including:

means for dispensing fuel;

means for accepting payment from a customer; and signal conversion means for converting internal signaling protocols to an IP-based signaling protocol, and connecting the fuel dispensers to the IP-based network; and a plurality of dispenser controllers for controlling the plurality of fuel dispensers through the IP-based network;

means for maintaining operation of all dispensers when a single dispenser controller fails, said means maintaining operation of all dispensers being utilized if customers do not attempt to utilize all of the dispensers at one time, and said means maintaining operation of all dispensers being utilized except for a last dispenser if customers attempt to utilize all of the dispensers at one time, said means comprising:

an interface between each of the plurality of dispenser controllers and the IP-based network;

means for sending control signaling from each of the plurality of dispenser controllers through the IP-based network to the fuel dispensing means in one or more of the dispensers;

means for sending control signaling from each of the plurality of dispenser controllers through the IP-based network to the payment accepting means in one or more of the dispensers; and means within each of the plurality of dispenser controllers for performing consumer card authorizations and recording purchase transactions.

21. The system for controlling an automated fueling station of claim 20 wherein the means for accepting payment from a customer includes means for reading a membership identification from a membership card, and the means for performing consumer card authorizations includes:

a membership card file of valid membership identifications; and means for accessing the membership card file and determining whether the membership identification read by the means for accepting payment is a valid membership identification.

22. The system for controlling an automated fueling station of claim 21 wherein the means for sending control signaling through the IP-based network to the fuel dispensing means sends a control signal turning on the dispenser when the membership identification read by the means for accepting payment is determined to be a valid membership identification.

23. The system for controlling an automated fueling station of claim 20 wherein the means for accepting payment from a customer includes means for reading a consumer credit card number, and the means for performing consumer card authorizations includes:

a local consumer card status file; and means for accessing the local consumer card status file and determining whether the credit card number read by the means for accepting payment is an authorized credit card number.

24. The system for controlling an automated fueling station of claim 23 further comprising a remotely located main office connected to the local consumer card status file through a data network, said main office passing consumer card status information to the local consumer card status file.

25. The system for controlling an automated fueling station of claim 20 further comprising a central control system remotely located from the fueling station comprising:

a spare controller configured to at least partially match the configuration of the dispenser controllers at the fueling station;

means for determining when a dispenser controller at the fueling station fails; and a routing device for routing communications between the spare controller and the fuel dispenser associated with the failed dispenser controller, in response to a determination that the failed dispenser controller has failed.

* * * * *